US012468865B2

(12) United States Patent
Dumas et al.

(10) Patent No.: US 12,468,865 B2
(45) Date of Patent: Nov. 11, 2025

(54) CONTROLLING OF OPERATIONS USING A TOOL DURING PRODUCTION OF AN ASSEMBLY OF PARTS

(71) Applicant: InBolt, Igny (FR)

(72) Inventors: Louis Dumas, Igny (FR); Rudy Cohen, Paris (FR); Albane Dersy, Neuilly sur Seine (FR)

(73) Assignee: InBolt, Igny (FR)

( * ) Notice: Subject to any disclaimer, the term of this patent is extended or adjusted under 35 U.S.C. 154(b) by 396 days.

(21) Appl. No.: 17/606,885

(22) PCT Filed: Apr. 23, 2020

(86) PCT No.: PCT/FR2020/050687
§ 371 (c)(1),
(2) Date: Oct. 27, 2021

(87) PCT Pub. No.: WO2020/229746
PCT Pub. Date: Nov. 19, 2020

(65) Prior Publication Data
US 2022/0222391 A1 Jul. 14, 2022

(30) Foreign Application Priority Data
May 13, 2019 (FR) ...................... 19 04977

(51) Int. Cl.
*G06F 30/17* (2020.01)
*B25F 5/02* (2006.01)
*G06F 30/12* (2020.01)

(52) U.S. Cl.
CPC ............... *G06F 30/17* (2020.01); *B25F 5/02* (2013.01); *G06F 30/12* (2020.01)

(58) Field of Classification Search
CPC . G06F 30/17; G06F 30/12; B25F 5/02; G05B 2219/31027; G05B 2219/31046;
(Continued)

(56) References Cited

U.S. PATENT DOCUMENTS

| 2011/0087360 A1* | 4/2011 | Chen ...................... B25J 9/1697 700/114 |
| 2013/0137468 A1* | 5/2013 | Kahle .................... G01C 15/00 455/457 |

(Continued)

FOREIGN PATENT DOCUMENTS

DE 102012219871 4/2014

OTHER PUBLICATIONS

International Search Report dated Aug. 24, 2020.

*Primary Examiner* — Thomas C Lee
*Assistant Examiner* — Tyler Dean Hedrick
(74) *Attorney, Agent, or Firm* — IPSILON USA, LLP

(57) ABSTRACT

A system for controlling operations during production of an assembly of parts is provided. The system includes a tool for performing manual operations on a plurality of elements of the assembly of parts, and locating means integrated at least in part into an electronic module attached to the tool and able to determine a location of at least one operation associated with an element by locating the position of the tool in a three-dimensional coordinate system associated with a set of modelling data representing a three-dimensional modelled image of the assembly of parts. The locating means includes a depth camera belonging to the electronic module and a processing module able to estimate the position of the portable hand tool on the basis of images captured by the depth camera.

21 Claims, 2 Drawing Sheets

(58) Field of Classification Search
CPC ........... G05B 2219/45055; G05B 2219/45127; G05B 19/41805; G06T 17/00
See application file for complete search history.

(56) References Cited

U.S. PATENT DOCUMENTS

| | | | |
|---|---|---|---|
| 2015/0253766 A1* | 9/2015 | Pettersson | G05B 19/41805 700/168 |
| 2016/0368148 A1* | 12/2016 | Payton | B25J 9/1697 |
| 2019/0354761 A1* | 11/2019 | Arshad | G06T 7/70 |
| 2020/0342237 A1* | 10/2020 | Marquette | F16P 3/141 |
| 2020/0386862 A1* | 12/2020 | Cop | G01S 17/89 |
| 2023/0036038 A1* | 2/2023 | Finley | A61B 34/10 |

\* cited by examiner

CONTROLLING OF OPERATIONS USING A TOOL DURING PRODUCTION OF AN ASSEMBLY OF PARTS

RELATED APPLICATION

This application is a National Phase of PCT/FR2020/050687 filed on Apr. 23, 2020, which claims the benefit of priority from French Patent Application No. 19 04977, filed on May 13, 2019, the entirety of which are incorporated by reference.

TECHNICAL FIELD

The present invention generally relates to operations of producing and/or maintaining an assembly of parts using a portable hand tool to allow an assembly technician to perform manual operations on elements of the assembly.

The portable hand tool may be a tightening tool (wrench or screwdriver) designed to perform tightening operations on tightening elements such as bolts and nuts forming bolted assemblies. The portable hand tool may also be a tool designed to fit elements such as rivets, or a tool designed to pierce holes, weld or cut at various places on the assembly of parts.

Technological Background

Controlling manual operations performed by an assembly technician using a hand tool during the assembly of parts is essential in many industry sectors, for example related to transportation, in particular the aerospace industry where assembly processes may be highly complex.

In particular, controlling tightening operations is necessary because the complexity of the assemblies and the often large number of tightening elements on which an assembly technician has to act are sources of error which are difficult to trace. Among the requirements identified to ensure the reliability of an assembly, it is in particular necessary to ensure that all bolted assemblies involved in a predefined assembly of parts have actually been tightened. It is also necessary to ensure that each bolted assembly that has actually been tightened has been tightened properly in terms of tightening torque. Specifically, an overly tightened bolted assembly may irreversibly damage the assembled parts. Conversely, a bolted assembly that has not been tightened enough may come undone under the action of vibrations.

Lastly, it is desirable to allow an assembly technician to control in real time the manual operations they perform using a hand tool during the production of an assembly of parts, and to optimize the time that they spend on this production.

Document U.S. Pat. No. 8,311,658 relates to a system for controlling tightening operations during the production of an assembly of parts, and for locating each of the tightening operations performed by an assembly technician manipulating a portable tightening tool by locating the portable tightening tool when the latter is moved at the location of each of the tightening operations. To do this, the system uses locating means comprising, on the one hand, a radiofrequency signal transmitter with which the portable tightening tool is equipped and, on the other hand, a plurality of radiofrequency beacons placed in the space in which the assembly is produced. The position of the tightening tool in a three-dimensional coordinate system linked to the production space, and therefore of the tightening element tightened by the tightening tool, is conventionally obtained on the basis of the radiofrequency signals transmitted from the location of the tightening tool and received by the radiofrequency beacons, for example using time-of-flight and true-range multilateration techniques. The radiofrequency signals transmitted from the location of the tightening tool may further comprise information relating to the status of each tightening operation, such as an indication that the tightening operation has started, is under way and/or has ended. The various positions occupied by the tightening tool that are determined by the locating means are transmitted via a communication network (WAN, LAN or Internet) to a reporting and display system comprising in particular portable device screens (telephones, tablets) and fixed computer screens. The reporting and display system converts each position that it receives in the three-dimensional coordinate system linked to the production space into a position in a three-dimensional coordinate system associated with a set of modelling data, for example a CAD file, representing a three-dimensional modelled image of the assembly of parts. The reporting and display system may then control the displaying, on the various screens, of images that highlight in real time the location of each tightening element on the three-dimensional modelled image, and the status of the tightening operation associated with each tightening element. The system described in document U.S. Pat. No. 8,311,658 thus makes it possible to locate, monitor and save, remotely, the status of various tightening operations. Furthermore, the technician responsible for the tightening operations may also control the state of progress of the tightening operations.

However, this system has a number of drawbacks. First, the system is expensive since it requires the use of a number of receiving beacons which may be significant depending on the complexity and dimensions of the assembly to be produced. In addition, locating techniques based on the use of waves may be skewed by the working environments in which the assembly technicians move. For example, the metal frames and skins of aircraft and spacecraft form a Faraday cage through which the waves cannot pass. It is additionally difficult to find the right positions for the beacons which optimize communication between the tightening tool and the beacons. Thus, optimization of the transmission protocol is generally required to overcome the problem of signal reflection. Lastly, such a system does not make it possible to obtain the level of accuracy required in some cases of use for the location (typically of the order of a millimetre or less than a millimetre).

SUMMARY OF THE INVENTION

In order to overcome the drawbacks mentioned above, the present invention provides a low-cost solution for locating and identifying, with high precision, manual operations performed on elements of a assembly of parts via a hand tool.

More particularly, the present invention relates to a system for controlling manual operations during production of an assembly of parts, the system comprising a portable hand tool allowing an assembly technician to perform manual operations on a plurality of elements of said assembly of parts, and locating means integrated at least in part into an electronic module attached to said portable hand tool, said locating means being able to determine a location of at least one manual operation associated with an element by locating the position of said portable hand tool in a three-dimensional coordinate system, characterized in that said three-dimensional coordinate system is linked to a three-dimensional model of said assembly of parts, in that the controlling system comprises a storage memory containing a plurality of CAD files allowing the construction of three-dimensional modelled images of the assembly of parts at various stages in production, and in that said locating means comprise a depth camera belonging to said electronic module and a processing module able to estimate and save a current position of said portable hand tool, said current position being estimated by aligning point clouds extracted from at least one current image captured by said depth camera with a mesh or point clouds extracted from a three-dimensional modelled image representative of a current state of said assembly of parts, said three-dimensional modelled image representative of a current state being constructed on the basis of one CAD file from among a plurality of CAD files contained in the storage memory.

According to other advantageous and non-limiting features of the system according to the invention:

said locating means may further comprise an inertial measurement unit integrated into said electronic module, the processing module being able to estimate a movement of the portable hand tool from a last estimated and saved current position on the basis of measurements delivered by said inertial measurement unit and to estimate at least one updated position of said portable hand tool on the basis of the last current position and said movement;

the processing module may be integrated into the electronic module, or into a remote apparatus; in the latter case, the electronic module comprises communication means able to transmit the images captured by the depth camera and the measurements from said inertial measurement unit to the remote apparatus for processing by the processing module;

the system may further comprise at least one portable user interface able to automatically indicate to said assembly technician a setpoint parameter to be applied for said element according to the location of the associated manual operation determined by said locating means;

said at least one portable user interface is integrated into said electronic module, and/or into a mobile telephone and/or into a portable tablet;

the user interface is preferably a display screen;

the setpoint parameter is pre-saved in the storage module of said system saving a set of setpoint parameters to be applied to each of said plurality of elements of said assembly of parts;

the electronic module may comprise validation means able to trigger automatic saving of information relating to the manual operation;

this validation means may be a manually operated button, the actuation of which triggers said automatic saving of information relating to the manual operation;

said information comprises the time of validation, and a reference allowing the unique identification of the element associated with the manual operation;

the hand tool is, for example, a tightening wrench or screwdriver, a riveting machine, a stapler, a drill, a cutter or a welder.

Another subject of the present invention is a method for controlling manual operations during production of an assembly of parts, the method comprising the following steps:

an assembly technician using a portable hand tool to perform manual operations on a plurality of elements of said assembly of parts; and determining a location of a manual operation associated with an element by locating the position of said portable hand tool in a three-dimensional coordinate system, the method being characterized in that the three-dimensional coordinate system is linked to a three-dimensional model of said assembly of parts, in that the method comprises a step of storing in a storage memory a plurality of CAD files allowing the construction of three-dimensional modelled images of the assembly of parts at various stages in the production, and in that the determining step comprises image captures by a depth camera belonging to an electronic module attached to said portable hand tool and a step of estimating and saving a current position of said portable hand tool by aligning point clouds extracted from at least one current image captured by said depth camera with a mesh or point clouds extracted from a three-dimensional modelled image representative of a current state of said assembly of parts, said three-dimensional modelled image representative of a current state being constructed on the basis of one CAD file from among the plurality of CAD files contained in the storage memory.

According to some possible implementations of the method:

the method may further comprise a step of estimating a movement of the portable hand tool from a last estimated and saved current position on the basis of measurements delivered by an inertial measurement unit belonging to said electronic module, and of estimating at least one updated position of said portable hand tool on the basis of the last current position and said movement;

the method may further comprise a step of automatically transmitting, to a portable user interface, a setpoint parameter to be applied for said element according to the location of the associated manual operation from the determining step;

the transmitting step preferably consists in displaying said setpoint parameter on a display screen integrated into said electronic module, into a mobile telephone and/or into a portable tablet.

BRIEF DESCRIPTION OF THE FIGURES

The following description provided with reference to the appended drawings, which are given by way of non-limiting example, will make it easy to understand what the invention consists of and how it may be implemented. In the appended figures.

DESCRIPTION OF ONE OR MORE EMBODIMENTS

In the figures, identical or equivalent elements will bear the same reference signs.

Hereinafter, the present invention will be described in the non-limiting context of controlling manual operations of the tightening type using a portable hand tool such as a screwdriver or a wrench, referred to hereinafter as a "portable tightening tool". However, the invention also applies to controlling other types of manual operations involving a hand tool. Thus, the portable hand tool may also be a tool designed to fit elements such as rivets or staples, or a tool designed to pierce holes at various locations on the assembly, to weld various parts of the assembly or cut parts of the assembly.

Several systems for controlling tightening operations using a portable tightening tool will now be described with reference to the figures. All of these systems have in common the use of locating means that are fully (FIGS. 1 and 2) or at least partly (FIG. 3) integrated into an electronic module attached to a portable tightening tool, these locating means being able to determine a location of at least one tightening operation associated with a tightening element by locating the position of the portable tightening tool, when it is facing the tightening element, in a three-dimensional coordinate system associated with a set of modelling data representing a three-dimensional modelled image of said assembly of parts. The portable tightening tool will be described hereinafter as a tightening wrench for nuts. However, the invention applies to other types of tightening tools designed for other types of tightening elements, for example to screwdrivers for tightening screws, or, as mentioned above, to other types of hand tools allowing other types of manual operations, for example a stapler, nailing machine, riveting machine, drill, welder or cutter. The hand tool may be any pre-existing hand tool (e.g. a conventional manual wrench or a torque wrench) to which the electronic module is subsequently attached. As a variant, the portable hand tool is designed to incorporate the electronic module from the outset.

Figure 1:
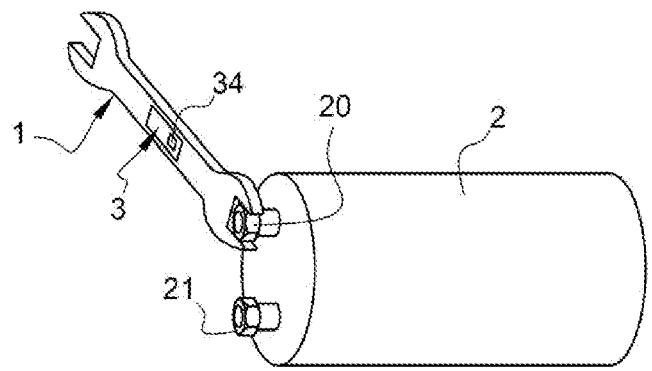
FIG. 1 illustrates, in simplified form, a system for controlling manual operations, in particular tightening operations, according to a first possible embodiment according to the invention.

FIG. 1 schematically illustrates, by way of non-limiting example, a portable tightening tool, here a tightening wrench 1 for nuts, belonging to a system for controlling manual operations of a given type, here tightening, when producing an assembly of parts, in accordance with a first possible embodiment of the invention. In FIG. 1, reference 2 represents an example of a part that an assembly technician has to assemble in an assembly (not shown) of parts, as well as two nuts 20, 21 that the technician has to tighten using the portable tightening tool 1 in order to assemble this part. The portable tightening tool 1 comprises an electronic module 3 which incorporates, in this first embodiment, all of the functionalities that allow the technician to control in real time the tightening operations they perform.

Figure 2:
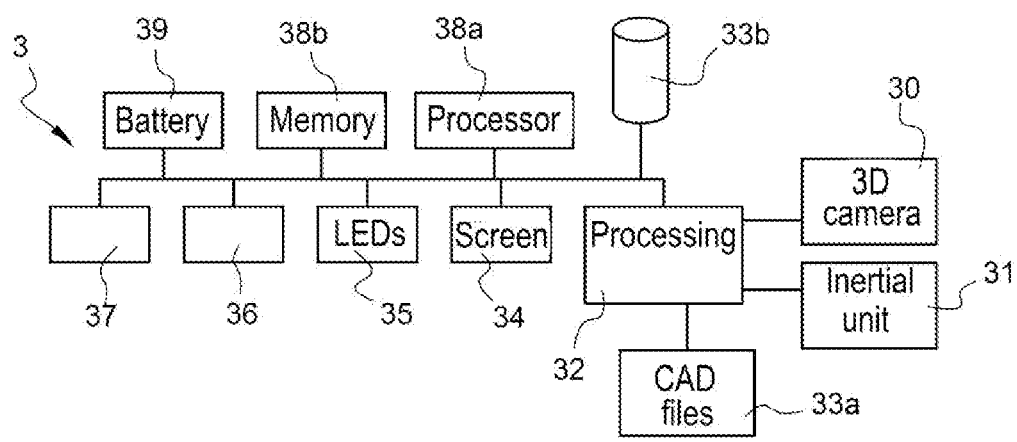
FIG. 2 illustrates, in the form of a block diagram, an electronic module of the system for controlling manual operations of FIG. 1.

FIG. 2 illustrates a block diagram of the electronic module 3 according to this first embodiment. As mentioned above, the electronic module 3 here comprises all of the locating means capable of locating the position of the tightening wrench 1. These locating means firstly comprise a depth camera 30 which captures three-dimensional images of the environment of the tightening wrench when the assembly technician moves this wrench in order to successively perform the various tightening operations during the production of the assembly. The depth camera 30 may be a stereoscopic camera, or a camera operating on the principle of time-of-flight (TOF camera), or what is referred to as a structured light camera. In one embodiment which is particularly advantageous for reasons given in the rest of the disclosure, the locating means of the electronic module 3 may further comprise an inertial measurement unit 31 able to deliver measurements of linear accelerations along three orthogonal axes linked to the electronic module (and therefore to the tightening wrench), and angular velocities. The locating means further comprise a processing module 32 which receives the three-dimensional images captured by the depth camera 30, and, where applicable, the measurements made by the inertial measurement unit 31. According to the present invention, the processing module 32 comprises a calculation algorithm that makes it possible to estimate the position of the electronic module 3 and, consequently, of the tightening wrench 1, on the basis of at least three-dimensional images captured by the depth camera 30. The position is estimated in a three-dimensional coordinate system linked to a 3D model of the assembly, this 3D model being obtained via three-dimensional modelling data contained in CAD files saved in a storage memory 33$a$, as will be explained hereinbelow. A database 33$b$ of the electronic module 3 makes it possible to save data relating to the tightening operations, in particular the identifiers of the tightening elements on which the technician acts during the assembly process.

As can be seen in FIG. 2, the electronic module 3 also comprises, in this example, various user interfaces, in particular a display screen 34. The user interfaces may further comprise one or more manually operated buttons 35, and one or more visual indicators 36, such as light-emitting diodes. The electronic module 3 also comprises one or more communication modules 37 allowing it to exchange information with external apparatuses such as a portable tablet, a PC or a server. If the hand tool is a connected tool (e.g. a smart torque wrench), a communication module may be provided in order to allow the electronic module 3 to exchange data with this connected tool. Any wire (Ethernet, etc.) or wireless (Wi-Fi, Bluetooth, etc.) communication protocol may be used. Lastly, FIG. 2 shows a microprocessor 38$a$ and its associated memory 38$b$, making it possible to control the operation of the various components of the electronic module 3, and a power battery 39.

The system of FIGS. 1 and 2 may be used as follows: The assembly technician takes up the tightening wrench 1 and moves it until it faces one of the bolted assemblies to be tightened, for example the bolted assembly 20 as shown in FIG. 1. On the basis of the images captured by the depth camera 30, the electronic module 3 will be able to calculate and save its position in relation to the three-dimensional model of the assembly. More specifically, as will be explained in greater detail below, a current position of the electronic module 3 may be estimated by aligning point clouds extracted from at least one current 3D image delivered by the depth camera 30 with point clouds extracted from a three-dimensional image modelling a current state of the assembly of parts (e.g. CAD files), which the processing module 32 obtains from the storage memory 33$a$. As a variant, the point clouds extracted from an image delivered by the depth camera 30 may be aligned directly on a three-dimensional mesh modelling a current state of the assembly of parts. The three-dimensional meshes may correspond directly to the CAD files modelling the assembly. In any case, the electronic module 3 is able to know at any time, or at least regularly, its relative position with respect to the current state of the modelled assembly. The estimate made on the basis of 3D images makes it possible to obtain a level of precision in the estimated position of less than one millimetre. Thus, when the tightening tool 1 is facing a bolted assembly on which the assembly technician is about to act, the system makes it possible to locate and thus identify this bolted assembly with a high degree of precision. As will be explained below, when the electronic module 3 is further equipped with the inertial measurement unit 31, the processing module 32 may advantageously be configured to estimate a movement of the tightening tool 1 from a last current position that it has estimated and saved on the basis of images captured by the depth camera 30, and to update the position of the tightening tool 1 according to this movement and this last estimated current position.

The setpoint parameters for each manual operation that the technician has to perform may advantageously have been saved beforehand, for example in the CAD files modelling the assembly that are saved in the storage module 33a of the electronic module 3. In the non-limiting example of the tightening tool 1, the parameters are tightening setpoints to be applied for each tightening element. For a riveting-type hand tool, the setpoint parameters relate to a force to be applied. For a drill-type hand tool, the setpoint parameters comprise, for example, the diameter and/or the speed of rotation of the drill bit. For a welder-type hand tool, the setpoint parameters comprise, for example, the diameter and speed of the wire, the pulse frequency and/or intensity of the welding arc. Thus, in one possible embodiment, according to the position of a particular tightening element in the assembly, estimated by the electronic module 3 on the basis of the images captured when the tightening tool is facing this element, this electronic module 3 may retrieve from the storage module 33a the setpoint, here tightening setpoint (typically a tightening torque), adapted for the tightening element on which the assembly technician is acting, on the basis of the estimated position, and automatically control the displaying of this tightening setpoint on the screen 34 of the electronic module 3. It should be noted that other user interfaces could be used in addition to or instead of the screen 34, for example a sound indicator providing the assembly technician with a sound signal to indicate the tightening setpoint parameter that they have to apply to a tightening element, according to the location of the tightening operation associated with this tightening element, or a display screen on a remote apparatus, for example a portable tablet (not shown in FIG. 1) with which the electronic module 3 may exchange information via a wireless communication module using, for example, the Wi-Fi or Bluetooth protocol.

In any case, time is indisputably saved for the assembly technician with respect to all existing solutions in which a technician must consult documentation in parallel in order to know the setpoint parameter that they have to apply for each element of an assembly.

The visual indicator 36, for example a diode, may emit light of a predetermined colour, for example green, so as to indicate to the assembly technician that they are indeed acting on the correct tightening element. Once the tightening has been performed, the technician may validate the tightening operation by means of, for example, a manually operated button 35. The actuation of this button then triggers the automatic saving, preferably in the database 33b, of information relating to the tightening operation that the assembly technician has just performed. This information advantageously comprises a precise timestamp of the end of the tightening operation, corresponding, for example, to the time at which the assembly technician validated the tightening operation via the button 35 (time of triggering of the button), and a reference for uniquely identifying the tightening element associated with the tightening operation. As a variant with respect to the actuation of a manually operated button, the validation of a tightening operation and the saving of the information relating to the tightening operation may be automatic in some embodiments: For example, in the case where the hand tool is a mechanical torque wrench, the measurements made by the inertial measurement unit 31, when this is present, can be used to identify a sudden acceleration of the wrench around the bolted assembly, corresponding to the clicking of the wrench when the tightening torque is reached. In another example where the hand tool is a connected torque wrench, that is to say one capable in particular of transmitting information, provision may be made for the wrench to transmit to the electronic module 3, via the communication module 37 configured with the communication protocol matched to that used by the wrench, the indication that the tightening torque input as setpoint has been reached, which corresponds to a validation of the operation.

The measurements made by the inertial measurement unit 31 may be used to estimate the tightening torque actually applied. As a variant, in the case where the portable tightening tool 1 is a smart or connected wrench capable of measuring the tightening torque that has actually been applied, provision may be made for the electronic module 3 to retrieve and save the tightening torque as measured by the wrench too.

The actuation of the button 35 may also trigger the automatic displaying on the screen 34 of the next tightening operation to be performed by the assembly technician, for example the tightening of the bolted assembly 21 in FIG. 1. The assembly technician repeats all of the operations described above for each of the tightening operations that they have to perform on their assembly. On completion of these operations, the assembly technician may be prompted, for example via a specific message displayed on the screen 34, to take a photograph of the assembly produced. The manually operated button 35 may serve as a trigger for taking the photograph via the camera 30. The photograph is advantageously saved, for example in the database 33b. It is thus possible to have visual proof of the quality of the assembly process.

In the embodiment described above, the assembly technician has a fully autonomous hand tool allowing the controlling, checking and monitoring of the manual operations on the assembly of parts.

Figure 3:
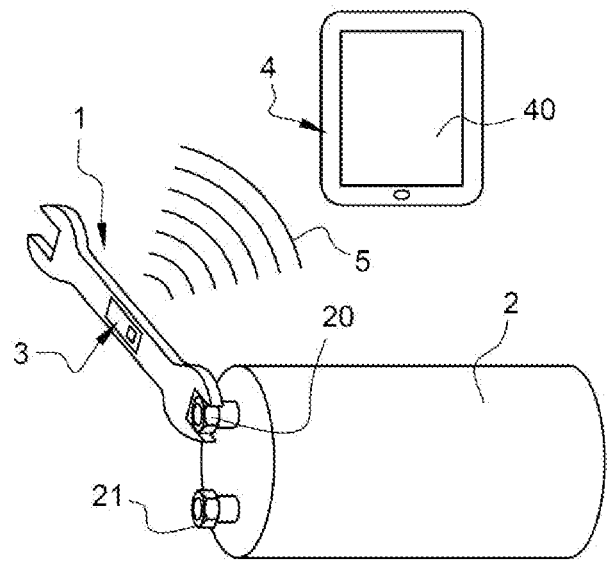
FIG. 3 illustrates, in simplified form, a system for controlling manual operations according to another possible embodiment according to the invention.

FIG. 3 illustrates another embodiment of a system for controlling tightening operations according to the present invention. This system is similar to the system described above with reference to FIGS. 1 and 2 in that it comprises an electronic module 3 attached to the portable tightening tool 1, this module comprising at least the depth camera 30, and preferably also the inertial measurement unit 31. However, the actual processing of the 3D images captured by the depth camera and, where applicable, the measurements from the inertial measurement unit is here not performed locally in the electronic module 3 but in a remote apparatus 4. This remote apparatus is preferably a portable tablet intended to be used by the assembly technician. In other words, the processing module 32, the storage module 33a and the database 33b which were described above with reference to FIG. 2 here are no longer integrated into the electronic module 3 but into the remote apparatus 4 (integration not shown in FIG. 3). All of the data required to estimate the position of the tool in relation to a model of the assembly are transmitted by the communication module 37 of the electronic module 3 to a corresponding communication module (not shown) of the portable tablet 4 via a communication link 5, for example a wireless link of Wi-Fi or Bluetooth type. The assembly technician thus has the screen 40 of the remote apparatus which is larger in size than the screen 34 of the module 3 of FIG. 3, thereby facilitating the controlling and monitoring operations. The current position of the tightening tool as estimated by the processing module may, for example, be viewed on the screen 40 in superposition with the three-dimensional modelled image of the assembly. Here again, a tightening setpoint adapted for the tightening element on which the assembly technician is about to act may advantageously be retrieved from the CAD model files contained in the database, on the basis of the estimated location of the tightening tool which makes it possible to identify the tightening element, and indicated to the assembly technician through displaying on the screen 40.

As in the system described above with reference to FIGS. 1 and 2, once the tightening has been performed, the tightening operation is validated, either manually by the technician by means of the manually operated button 35, or automatically. In any case, the validation triggers the automatic saving, in the database of the electronic module 3 and/or in the remote database in the remote apparatus, of information relating to the tightening operation that the assembly technician has just performed.

A controlling system according to the invention therefore allows the assembly technician to be able to check in real time that they have indeed tightened all of the tightening elements, and in the variant for which the adapted tightening setpoints are additionally supplied to the technician automatically, to ensure that each tightening element has been tightened with the correct tightening parameter.

All of the information saved by the electronic module 3 and/or by the remote apparatus 4 may be retrieved and displayed at any time. Table 1 below gives an exemplary representation of the status of a tightening operation relating to a given tightening element.

TABLE 1

| Time | Tightening element reference | Tightening torque | Status of the tightening action |
| --- | --- | --- | --- |
| 11:57 | 11532 | 120 N · m | OK |

In the example above, the assembly technician or any other person may verify that the tightening element bearing the reference 11532 was tightened at 11:57 (corresponding to the time of validation of the tightening operation), with a setpoint or estimated tightening torque equal to 120 N·m. Other information may be added, such as the date of the tightening action, or an identifier uniquely associated with an assembly technician.

Various possible steps to be implemented in a method for locating a movable object in a given environment on the basis of images captured by a depth camera and data measured by an inertial measurement unit of an electronic module attached to or integrated into the movable object will now be described in detail with reference to FIG. 4. The movable object that it is desired to locate may be the portable hand tool 1 described above in the non-limiting context of controlling manual tightening operations, in which case the locating method may be implemented by a calculation algorithm of the processing module 32 of the electronic module 3, or a remote processing module in a remote apparatus 4. More generally, the object that it is desired to locate may be any object capable of moving or being moved within an environment, for example the end of a robotic arm.

Hereinafter, it is considered, in a non-limiting manner, that the environment in which the movable object will be located corresponds to the production space in which an assembly of parts is produced.

It is recalled that the data that are available for estimating the location of the electronic module and, consequently, of the movable object to or into which this module is fixed or integrated, are:
- the CAD files containing the data allowing the assembly of parts to be modelled in three dimensions;
- the three-dimensional images captured by the depth camera; and
- the measurements delivered by the inertial measurement unit.

In the context of application to the controlling of manual operations such as tightening, the CAD files must make it possible to model the assembly of parts at various stages in the assembly process. In other words, modelling data allowing the construction of various digital models representative of the assembly at various stages in the production of this assembly are available.

The objective of the algorithm described below is to identify the relative position of the electronic module integrating the depth camera and the inertial measurement unit in a three-dimensional coordinate system associated with the digital model corresponding to a current state of the assembly of parts.

1. Determining the Digital Model Corresponding to the Modelled Current State of the Assembly (Step 100 in FIG. 4):

As mentioned above, the assembly may be in a number of states depending on the parts which have or have not been assembled. To obtain the position, the algorithm needs to know the current state of the digital model because it compares what is observed by the depth camera with what is observed digitally, i.e. with a three-dimensional modelled image representative of the current state of the assembly of parts. The current digital model may be directly filled in by a third party (operator, production monitoring software), selecting from the CAD files that which represents the current state of the digital model. As a variant, the current digital model is determined on the basis of a selection of points of interest extracted from a current three-dimensional image provided by the depth camera, with which are associated local parameters calculated according to techniques conventionally used in 2D/3D object recognition. To determine the modelled current state of the assembly, the calculated local parameters are compared with parameters obtained in the same manner by digitally simulating what the camera sees on the basis of the 3D models at the various stages in the assembly.

Figure 4:
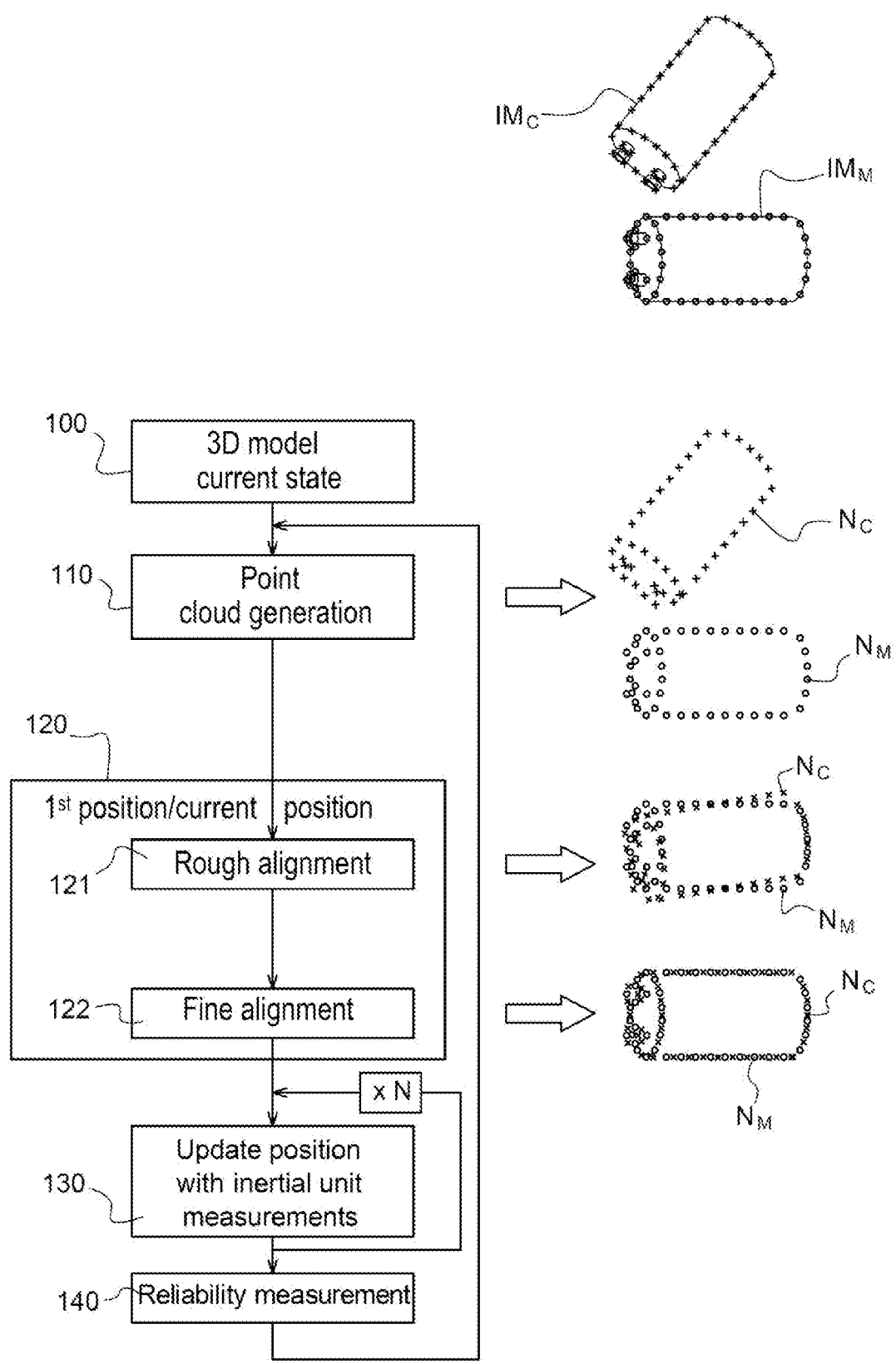
FIG. 4 illustrates possible steps to be implemented in a method for estimating the position of a movable object on the basis of images captured by a depth camera and data measured by an inertial measurement unit of an electronic module that is attached to or integrated into the movable object, implemented, for example, in the systems for controlling manual operations, in particular tightening operations, of FIGS. 1 to 3.

On the right in FIG. 4, there is illustrated an exemplary three-dimensional current image $Im_C$ of a real assembly, captured by the depth camera, and the modelled three-dimensional image $Im_M$ corresponding to the modelled current state of the assembly. In this example, the assembly in question corresponds to the part 2 and to the nuts 20, 21 of FIGS. 1 and 3.

2. Generating the Point Clouds and Determining a First Position/Current Position of the Module (Steps 110 and 120 in FIG. 4):

The general principle applied to determine the relative position of the module in relation to the digital model consists in searching for the transformation required to align the captured three-dimensional image $Im_C$ with the modelled three-dimensional image Imran. In practice, the calculation algorithm is configured to extract, in a step 110:

on the one hand, a point cloud of the current three-dimensional image captured by the depth camera (this point cloud being referred to as the "source" point cloud); and on the other hand, a point cloud of the modelled three-dimensional image (this point cloud being referred to as the "target" point cloud).

The right-hand portion of FIG. 4 illustrates a "source" point cloud $N_C$ extracted from the current three-dimensional image $Im_C$ and a "target" point cloud NM extracted from the modelled three-dimensional image $Im_M$.

To obtain the most accurate representation of the "source" point cloud possible and thus facilitate the alignment of the two point clouds, step 110 will preferably use a plurality of images captured successively by the depth camera over a given period, each captured image being converted into a point cloud. The times of capture of these successive images are preferably sufficiently close together (corresponding, for example, to a frequency of capture of 30 images per second) that the various shots are similar. The point clouds obtained via these successive shots are then aligned so as to form just one "source" point cloud. To align these point clouds and form the source point cloud, step 110 will calculate the relative movement between each shot on the basis of the measurements delivered by the inertial measurement unit. By proceeding in this way, a very high density of points is advantageously obtained while the digital noise potentially created by the depth camera is decreased.

The process of aligning the "source" point cloud with the "target" point cloud is preferably performed in two stages, first performing a rough alignment (sub-step 121) and then refining the alignment (sub-step 122).

For the implementation of the rough alignment, sub-step 121 comprises, for example, randomly selecting a plurality of points in the "source" point cloud. Each selected point is paired with the point in the "target" point cloud which has local parameters closest to those associated with the selected point, and it is sought to optimize the transformation which minimizes the distances between the points of one and the same pair.

The right-hand portion of FIG. 4 opposite sub-step 121 illustrates the result of a rough alignment of the "source" point cloud $N_C$ extracted from the current three-dimensional image $Im_C$ and the "target" point cloud NM extracted from the modelled three-dimensional image $Im_M$.

Starting from the alignment found in sub-step 121, sub-step 122 implements an algorithm of ICP (iterative closest point) type, which consists in associating each point in the "source" point cloud with the closest point, in terms of Euclidean distance, in the "target" point cloud, and then in iteratively searching for the transformations required to minimize the distance between each paired point. For each iteration of the optimization, the points are re-associated.

On completion of sub-step 122, the electronic module knows the transformation required to obtain the alignment of the points in the clouds and consequently, deduces therefrom its position in the three-dimensional coordinate system linked to the modelled image.

As mentioned above, in one variant implementation of the method, the point clouds extracted from an image delivered by the depth camera 30 may be aligned not on point clouds modelling the assembly, but directly on a three-dimensional mesh modelling a current state of the assembly of parts.

3. Updating the Position by Measuring the Acceleration (Step 130 of FIG. 4):

In order not to have to repeat steps 110 to 120 too often, which are costly in terms of computing time, the calculation algorithm will advantageously update the position by calculating, in step 130, the movement of the module in relation to the previously saved position on the basis of measurements delivered by said inertial measurement unit. The position may thus be updated using, for example, Kalman filtering in a conventional manner.

However, for each update of the position, a new three-dimensional image is captured by the depth camera. This image may advantageously be transformed into a point cloud and be aligned with the "target" point cloud on the basis on the previously calculated movement, and then added to the "source" point cloud. To prevent the "source" point cloud from containing too many points, which could lead to memory problems, the algorithm may advantageously filter the "source" cloud by randomly deleting points when a region is too dense. A smarter way of selecting surplus points may also be envisaged by prioritizing the deletion of points that are relatively inconsistent and/or by replacing small dense sets of points with their barycentres.

Step 130 may be repeated a certain number of times, for example a predetermined number N of times, as indicated in FIG. 4. However, the movement calculation is subject to a significant loss of accuracy over time, in particular because the acceleration measurements are integrated twice to calculate the movement. To counter this phenomenon, after N iterations, the calculation algorithm may advantageously perform a re-alignment of all of the point clouds acquired by the depth camera in step 130, on the "target" point cloud, using, for example, an ICP-type algorithm.

4. Reliability of the Estimated Position (Step 140 in FIG. 4):

The updating of the estimate of the position of the electronic module using the measurements delivered by the inertial measurement unit may be performed for as long as the estimated position is considered to be reliable. It is therefore desirable to periodically check the reliability of the estimate. To do this, the calculation algorithm may be advantageously configured, in a step 140, to align a point cloud extracted from an image captured by the camera with the "source" point cloud on the basis of its position as estimated. The reliability of the position is then defined as the sum of the Euclidean distances of each point in the "source" cloud in relation to the "target" cloud. If the reliability is above a certain predefined threshold, the estimate of the position using the measurements from the inertial measurement unit have to be considered as unreliable. The calculation algorithm is then configured to restart the steps from step 110.

Associating the measurements from the inertial measurement unit with the processing of the images captured by the depth camera may have many advantages, in addition to the saving in terms of computing costs. Thus, for example, in the context of the application of the electronic module to controlling tightening operations during an assembly of parts, the depth camera might not give sufficiently sharp images for objects that are too close. The measurements delivered by the inertial measurement unit thus make it possible to fill in the periods in which the camera might be insufficient, by making it possible to estimate a position of the portable tightening tool even when the latter is as close as it gets to the tightening element. In addition, although a depth camera already makes it possible to obtain a level of accuracy of the order of a millimetre in the position estimate, the gain in accuracy may still be improved by associating acceleration measurements for the update of the estimated position, for example through Kalman filtering.

The invention claimed is:

1. A system for controlling operations during production of an assembly of parts, the system comprising:
   a tool allowing operations on a plurality of elements of said assembly of parts, and locating means integrated at least in part into an electronic module attached to said tool, said locating means being able to determine a location of at least one operation associated with an element by locating the position of said tool in a three-dimensional coordinate system, wherein said three-dimensional coordinate system is linked to a three-dimensional model of said assembly of parts,
   in that the controlling system comprises a storage memory containing a plurality of CAD files allowing the construction of three-dimensional modelled images of the assembly of parts at various stages in production,
   and in that said locating means comprise a depth camera belonging to said electronic module and a processing module able to estimate and save a current position of said tool, said current position being estimated by a search for the transformation required to align point clouds extracted from at least one current image captured by said depth camera, called source point clouds, with a mesh or point clouds extracted from a three-dimensional modelled image representative of a current state of said assembly of parts, called target mesh or target point clouds, said three-dimensional modelled image representative of a current state being constructed on the basis of one CAD file from among the plurality of CAD files contained in the storage memory, wherein the search comprises a rough alignment followed by a refinement of said rough alignment,
   said system controlling the tool using the at least one operation associated with the element at the position of said tool.

2. The system according to claim 1, wherein said locating means further comprise an inertial measurement unit integrated into said electronic module, and in that the processing module is able to estimate a movement of the tool from a last estimated and saved current position on the basis of measurements delivered by said inertial measurement unit and to estimate at least one updated position of said tool on the basis of the last current position and said movement.

3. The system according to claim 1, wherein the processing module is integrated into the electronic module.

4. The system according to claim 1, wherein the processing module is integrated into a remote apparatus.

5. The system according to claim 4,
   wherein said locating means further comprise an inertial measurement unit integrated into said electronic module, and in that the processing module is able to estimate a movement of the tool from a last estimated and saved current position on the basis of measurements delivered by said inertial measurement unit and to estimate at least one updated position of said tool on the basis of the last current position and said movement,
   wherein in that said electronic module comprises communication means able to transmit the images captured by the depth camera and the measurements from said inertial measurement unit to the remote apparatus for processing by the processing module.

6. The system according to claim 1, further comprising at least one portable user interface able to automatically indicate a setpoint parameter to be applied for said element according to the location of the associated operation determined by said locating means.

7. The system according to claim 6, wherein said at least one portable user interface is integrated into said electronic module, and/or into a mobile telephone and/or into a portable tablet.

8. The system according to claim 6, wherein the user interface is a display screen.

9. The system according to claim 6, wherein said setpoint parameter is pre-saved in the storage module of said system saving a set of setpoint parameters to be applied to each of said plurality of elements of said assembly of parts.

10. The system according to claim 1, wherein the electronic module comprises validation means able to trigger automatic saving of information relating to the operation.

11. The system according to claim 10, wherein the validation means is a manually operated button, the actuation of which triggers said automatic saving of information relating to the operation.

12. The system according to claim 10, wherein said information comprises the time of validation, and a reference allowing the unique identification of the element associated with the operation.

13. The system according to claim 1, wherein said tool is mounted on an end of a robotic arm.

14. The system according to claim 1, wherein an end of a robotic arm is formed by said tool.

15. The system according to claim 1, wherein the rough alignment comprises a random selection of a plurality of points in the source points clouds, each selected point being paired with a corresponding point from the target mesh or point clouds, wherein the refinement comprises an association of each point in the source point clouds with the closest point, in terms of Euclidean distance, in the target point clouds.

16. The system according to claim 1, wherein the depth camera is a structured light or stereoscopic camera and the at least one current image is a depth map, wherein the processing module is configured to select the CAD file the current state is based on from the plurality of CAD files according to a stage identifier associated with the current state of the assembly of parts being constructed.

17. A method for controlling operations during production of an assembly of parts, the method comprising the following steps:
   performing operations on a plurality of elements of said assembly of parts; and
   determining a location of an operation associated with an element by locating the position of said tool in a three-dimensional coordinate system,
   wherein
   the three-dimensional coordinate system is linked to a three-dimensional model of said assembly of parts,
     in that the method comprises a step of storing in a storage memory a plurality of CAD files allowing the construction of three-dimensional modelled images of the assembly of parts at various stages in production,
     and in that the determining step comprises image captures by a depth camera belonging to said electronic module attached to said tool and a step of estimating and saving a current position of said tool by searching for the transformation required to align point clouds extracted from at least one current image captured by said depth camera, called source point clouds, with a mesh or point clouds extracted from a three-dimensional modelled image representative of a current state of said assembly of parts, called target mesh or target point clouds, said three-dimensional modelled image representative of a current state being constructed on the basis of one CAD file from among the plurality of CAD files contained in the storage memory, wherein the searching comprises a rough alignment followed by a refinement of said rough alignment, controlling the tool using the at least one operation associated with the element at the position of said tool.

18. The method according to claim 17, wherein said method further comprises a step of estimating a movement of the tool from a last estimated and saved current position on the basis of measurements delivered by an inertial measurement unit belonging to said electronic module, and of estimating at least one updated position of said tool on the basis of the last current position and said movement.

19. The method according to claim 17, wherein said method further comprises a step of automatically transmitting, to a portable user interface, a setpoint parameter to be applied for said element according to the location of the associated operation from the determining step.

20. The method according to claim 19, wherein the transmitting step consists in displaying said setpoint parameter on a display screen integrated into said electronic module, into a mobile telephone and/or into a portable tablet.

21. The method according to claim 17, wherein the rough alignment comprises randomly selecting a plurality of points in the source points clouds, each selected point being paired with a corresponding point from the target mesh or point clouds, wherein the refining comprises associating each point in the source point clouds with the closest point, in terms of Euclidean distance, in the target point clouds.

* * * * *